United States Patent [19]
Rouillard

[11] Patent Number: 5,849,095
[45] Date of Patent: Dec. 15, 1998

[54] ANTI-ETCH BOTTLE WASHING SOLUTION

[76] Inventor: Carol Rouillard, 7667 Hunter's Pointe, Brighton, Mich. 48116

[21] Appl. No.: 839,406

[22] Filed: Apr. 11, 1997

Related U.S. Application Data

[63] Continuation-in-part of Ser. No. 629,635, Apr. 9, 1996.

[51] Int. Cl.$^6$ .............................. C23G 1/02; H01L 27/095
[52] U.S. Cl. ................. 134/3; 252/476; 510/179; 510/398
[58] Field of Search ................... 134/3; 252/476; 510/179, 398

[56] References Cited

U.S. PATENT DOCUMENTS

| | | | |
|---|---|---|---|
| B 520,546 | 3/1976 | Sorgenfrei et al. | 252/156 |
| 2,419,805 | 4/1947 | Wegst et al. | 252/156 |
| 2,425,907 | 8/1947 | Wegst et al. | 252/156 |
| 2,447,297 | 1/1948 | Wegst et al. | 252/135 |
| 3,669,893 | 6/1972 | Clarke et al. | 252/156 |
| 4,110,262 | 8/1978 | Arnau et al. | 252/545 |
| 4,201,688 | 5/1980 | May | 252/180 |
| 4,230,592 | 10/1980 | Miller et al. | 252/156 |
| 4,390,451 | 6/1983 | Havinga et al. | 252/311 |
| 4,446,046 | 5/1984 | Becker | 252/181 |
| 4,477,290 | 10/1984 | Carroll et al. | 148/6 |
| 4,965,019 | 10/1990 | Schmid et al. | 252/321 |
| 5,024,783 | 6/1991 | Busch et al. | 252/180 |
| 5,084,198 | 1/1992 | Ahmed et al. | 252/99 |
| 5,145,608 | 9/1992 | Wershofen | 252/544 |
| 5,294,364 | 3/1994 | Thomas et al. | 252/142 |
| 5,382,295 | 1/1995 | Aoki et al. | 134/2 |
| 5,472,630 | 12/1995 | Ouyang et al. | 252/156 |
| 5,536,884 | 7/1996 | Stoeckigt et al. | 510/514 |
| 5,545,347 | 8/1996 | Ouyang et al. | 510/254 |
| 5,622,569 | 4/1997 | Dennis et al. | 134/2 |

FOREIGN PATENT DOCUMENTS 0235961  9/1987  European Pat. Off. .

*Primary Examiner*—Kriellion S. Morgan
*Attorney, Agent, or Firm*—A. Kate Huffman

[57] ABSTRACT

Chemical etching of bottles in a bottle washer is minimized by soaking the bottles in a highly caustic composition which does not include any phosphorus compounds, ethylene diamine tetraacetic acid or nitrilotriacetic acid. The soaking composition includes the sodium hydroxide dissolved in water, in combination with polycarboxylic acid crystal growth inhibitors. Preferably, the soaking solution further includes a nonionic surfactant such as an alkyl polyglucoside, as well as a chelant such as a gluconate, glucoheptonate, or boroheptonate. The soaking solution can be added by either combining a liquid or powder built detergent composition which also forms a portion of the present invention or, alternately, an additive package, not including the sodium hydroxide, can be added. These compositions effectively clean the bottles and significantly reduce the dissolution of the glass which can, in turn, cause a hazing and weight loss. This also reduces the amount of silicate scale formed in the bottle washing apparatus.

20 Claims, No Drawings

ANTI-ETCH BOTTLE WASHING SOLUTION

RELATED APPLICATIONS

This is a continuation-in-part of application Ser. No. 08/629,635, filed Apr. 9, 1996, entitled "Anti-Etch Bottle Washing Solution," which is pending.

BACKGROUND OF THE INVENTION

Glass bottles, particularly those used for soft drinks and beer, are frequently reused. In order to reuse these, the bottle must be cleaned and sterilized once returned to the bottler. This is accomplished using a bottle washing apparatus which has three or four sections. The bottles are introduced to the machine and supported throughout the washing process by individual holders or pockets. Bottles are initially directed to a pre-rinse section which is designed to remove large particles and labels. In this section, water and residual chemicals from the cleaning process are directed at the bottles as they are introduced into the machine.

Next the bottles are conveyed into a cleaning or soaking section where they are soaked in a highly caustic solution at an elevated temperature, generally about 70° C. or higher. After 7 to 15 minutes, the bottles are taken to a warm rinse, and then to a final potable water rinse. The final rinse water is then re-used for the subsequent initial pre-rinse.

The cleaning or soaking solution is a highly caustic solution. Generally, this contains 2–4% sodium hydroxide. This acts to clean the bottles, dissolve metals such as metal foils contained in the main label and the band label on the neck of the container. Also, in combination with temperature and contact time, this highly caustic solution renders the bottles commercially sterile.

Although some operators clean bottles with caustic by itself, this is generally unacceptable. Caustic alone is not an effective detergent and it is not free rinsing. Further, it will cause calcium and magnesium ions to precipitate out of solution in the form of salts. The resulting precipitate leaves spots on bottles and can accumulate on the equipment as a tenacious scale. Such scale reduces the efficiency of the bottlewasher and increases energy consumption by hindering heat transfer.

To improve rinsability and detergency, a surfactant(s) is generally added to the soaking solution. The surfactant(s) serves many purposes. It helps the caustic wet and penetrate the soil and aids in soil dispersion. Surfactants also prevent soil from redepositing back onto clean bottles, provide foam control and enhance overall cleaning.

To prevent calcium and magnesium precipitation, a combination of chemicals is used. Chelants are used, which bind to the cations and prevent them from reacting with other detergent components and precipitating out of solution. Typical chelants include ethylene diamine tetraacetic acid, nitrilotriacetic acid, complex phosphates and alkali metal salts thereof, as well as the alkali metal salts of gluconic acid.

Sequestrants are also used to prevent hardness precipitation. The primary sequestrants are the orthophosphates and phosphonates. Scale is also controlled through the use of crystal growth inhibitors. These are the polycarboxylic acids such as polyacrylic acid, polymethacrylic acid, polymaleic acid, and copolymers thereof. These also act as threshold inhibitors and play a very important role in the overall process. Residual polycarboxylic acid is carried from the warm rinse back over to the pre-rinse. Thus, it prevents scale formation in the pre-rinse section, as well as scale formation and spotting in the rinse sections.

The caustic bottlewash process is chemically aggressive on the glass. The level of causticity is sufficient to partially dissolve the glass matrix overtime at normal bottlewash temperatures. Scratches on the surface of the glass, in turn, increase the surface area for the caustic to attack, which again increases the dissolution of the glass. This can make the scratch appear larger, which in turn makes the bottle appear aesthetically unappealing. Eventually, the appearance of the bottle may become so unacceptable to consumers that it must be discarded before its useful life is over. It is an important goal in washing bottles to maintain the appearance of the bottle, thus allowing it to be used more times, getting more value for the cost of the bottle.

Further, when glass is dissolved the silica is released, making it available to complex with other materials in the wash solution to form silicates. Silicates build up on the equipment as silicate scale, which is extremely difficult to remove. In fact, this generally must be physically scraped from surfaces. To do so, the bottlewasher must be shut down and emptied, causing a loss in productivity.

Finally, dissolution of the glass is undesirable since any of the impurities that are present in the glass end up dissolved in the washing solution, which in turn must be eventually discarded. This can cause environmental problems and can be a source of quality concern if these materials are not rinsed from the bottle.

There have been attempts to minimize the etching or dissolution of glass in bottle washing solutions. Generally, these attempts have involved adding metal ions such as zinc, aluminum or beryllium to the solution. Past attempts to solve this problem are disclosed, for example, in Wegst U.S. Pat. No. 2,419,805, Wegst U.S. Pat. No. 2,447,297, Wegst U.S. Pat. No. 2,425,907, and British Patent 1443570. Adding metal ions to a washing solution is not an acceptable way to solve this problem. This is undesirable in the case of heavy metals like zinc and beryllium from an environmental perspective, and because they can pose a health risk if not completely rinsed from the bottle. Adding aluminum is also unacceptable as it contributes to scale in the bottlewasher.

SUMMARY OF THE INVENTION

The present invention is premised on the realization that a caustic bottle washing solution can be formed which significantly reduces the dissolution of silica without the use of added metal ions. More particularly, the present invention is premised upon the realization that a highly caustic bottle washing solution which deters the dissolution of silica can be formed from sodium hydroxide, in combination with a crystal growth inhibitor and substantially free from several compounds found to promote etching of glass. These etch-promoting compounds include certain chelants and sequestrants typically used in glass washing compositions, and specifically ethylene diamine tetraacetic acid, nitrilotriacetic acid, and phosphorous compounds including the phosphates and higher concentrations of the phosphonates. By providing a soaking solution which includes caustic and crystal growth inhibitor, but does not include the EDTA, NTA, phosphates or high concentrations of phosphonates, a highly effective glass washing solution is provided which does not promote caustic etching of the glass.

The present invention can further include surfactants and certain chelants, which also inhibit the etching of glass. The surfactants particularly include nonphosphated, nonionic surfactants such as alkyl polyglycocides. Suitable chelants include gluconic acid and its salts, as well as alkali metal glucoheptonates and alkali metal boroheptonates.

By employing this chemistry, one can provide an effective bottle washing solution which minimizes etching of the glass. This, in turn, will prolong the useable life of the bottle and minimize silicate formation on the bottle washing apparatus. An additional advantage is realized in that all of these etch-inhibiting materials contribute to the washing process.

The objects and advantages of the present invention will be further appreciated in light of the following detailed description.

DETAILED DESCRIPTION

The present invention encompasses bottle washing compositions, bottle washing solutions, as well as the process of washing bottles. The bottle washing solution refers to the caustic solution actually present in a bottle washer. The bottle washing solution is formed by combining bottle washing composition(s) with water.

The bottle washing apparatus will generally have a volume of water to which the bottle washing composition, i.e., sodium hydroxide and other chemicals, are added to form the bottle washing solution. The formed bottle washing solution will generally include 1–7.5% by weight of caustic, preferably 1–4%. Although potassium hydroxide can be used, sodium hydroxide is preferred because of its increased alkalinity and generally lower cost.

In addition to the sodium hydroxide, the bottle washing solution will include a crystal growth inhibitor. This will act to prevent scale formation and promote easier rinsing of the bottlewash solution. It also has the added advantage of providing threshold inhibition in the warm rinse section due to solution carryover from the soak tank, which further provides threshold inhibition in the pre-rinse section of the washer since water from the warm rinse section is redirected back to the pre-rinse.

The crystal growth inhibitor is a low molecular weight (modified or unmodified) polycarboxylic acid or salt thereof. The polycarboxylic acid can include polyacrylic acid, polymethacrylic acid and polymaleic acid and copolymers thereof. Generally, the average molecular weight of these polymers will be from about 1000 to about 100,000. The determining factor with respect to molecular weight is primarily the ability of the polymer to dissolve in the soaking solution.

Generally, 25–2000 ppm of the polymer will be present in the soaking solution, and preferably 50 to 1000 ppm. Preferred crystal growth inhibitors include Acusol 505N which is an acrylic acid, maleic acid copolymer salt having an average molecular weight of about 40,000. This is sold by Rohm & Haas as a 35% solid solution. A second preferred crystal growth inhibitor is Accusol 479N which is also an acrylic acid, maleic acid copolymer sodium salt having an average molecular weight of about 70,000, also sold by Rohm & Haas as a 40% solid solution. A third preferred polycarboxylic acid is Alcosperse 408, which is a polyacrylic acid (sodium anionic terpolymer), 3000 average molecular weight, sold by Alco as a 43% solid solution. Dry versions of the above can also be employed for powdered formulation, adjusting concentrations to account for the fact that the dry versions are more active on a per weight basis.

The soaking solution should further include a surfactant which does not promote etching and in an amount effective to improve soil dispersion. Non-etching surfactants include the nonionic surfactants and in particular the polyalkylglucosides, as well as certain anionic and amphoteric surfactants. Certain of these, such as the polyalkylglucosides, actually inhibit caustic etching. Preferably, the washing solution will have 100–2500 ppm polyalkylglucoside (active), preferably 200–2000 ppm. One preferred polyalkylglucosides is Glucopon 425 CS which is a 50% actives solution. Phosphate-containing surfactants tend to promote etching and should not be employed. Other nonionic surfactants which do not promote etching are the polysorbates such as polyoxyethylene (20) polysorbitan mono-oleate.

The soaking solution can also include various anionic and amphoteric surfactants to promote solution stability. Typical anionic and amphoteric surfactants include sodium salts of carboxylated linear alcoholalkoxylates, lauryl sulfate, sodium xylene sulfonate, toluene sulfonic acid and salts thereof, sulfosuccinate salts, fatty acids and their salts, anionic glucoesters such as disodium cocoglucoside citrate, disodium cocoglucoside sulfosuccinate and sodium cocopolyglucose tartrate, iminodipropionates such as disodium tallow iminodipospionate, as well as disodium cocoamphodiacetate and cocoamphocarboxyalcinate, and the imidazolines. These are used as hydrotropes and could be present in a liquid solution at a concentration of 0–20% by weight. Their use concentration will be from 0 to about 2500 ppm.

In addition, the soaking solution will preferably include a chelating agent. It is very important that the chelating agent not be ethylene diamine tetraacetic acid or nitrilotriacetic acid. Both of these materials which are commonly used in bottle washing solutions promote glass etching. Preferably, the chelating agent will be gluconic acid or a water-soluble salt thereof, an alkali metal glucoheptonate, or an alkali metal boroheptonate. About 250 to 2000 ppm of the chelating agent should be present in the soaking solution, with about 1000 ppm being preferred.

As previously mentioned, the soaking solution should be substantially free of certain chemicals which are typically used in bottle washing solutions. These are chemicals which further accelerate etching. Specifically, the present invention should not include any phosphate-containing materials such as sequestrants, fillers or other compositions. Further, phosphonate concentration should be less than 2000 ppm. Phosphonates actively deter etching at concentrations of 5 to about 1000 ppm. Phosphonates are acceptable at higher concentrations in the rinse section due to the mild pH. One preferred phosphonate is phosphene,1,2,4 butane tricarboxylic acid.

Concentrations at or above those listed in Table 1 have been shown to accelerate caustic attack. This is for one component. If combinations of such compositions are present, lower concentrations will cause etching. Preferably, no detectable amounts of these compositions will be present in the washing solution.

TABLE 1

| CONCENTRATION OF ETCH ACCELERATORS USING SINGLE INGREDIENTS | |
| --- | --- |
| MATERIAL | CONC. (PPM) |
| EDTA | 100 |
| SODIUM TRIPOLYPHOSPHATE | 100 |
| TRISODIUM PHOSPHATE | 100 |
| PHOSPHORIC ACID | 75 |
| ALCOHOL ALKOXYLATE PHOSPHATE ESTER | 400 |

The soaking solution can be formed by adding the individual components separately to the water in the bottle washer or all of the components can be combined in desired proportions and added to the water. The bottle washing composition may include the NaOH or the NaOH can be purchased and added separately. Further, the bottle washing composition can be formulated as a liquid or a powder.

An all-in-one powder formulation which incorporates the sodium hydroxide will include at least 60%, and preferably 80%, sodium hydroxide, in combination with 0.1% to about 5% crystal growth inhibitor, and optionally 0 to 10% and preferably at least 2% chelant, 0 to 10% and preferably at least 0.1% nonionic surfactant, and 0 to 10% filler. The filler, in this case, can be compositions such as sulfates, carbonates, bicarbonates and the like. As previously indicated, the composition will not include NTA, EDTA, or any phosphate. The recommended use concentration of this composition in the soaking solution would be about 2.5% to 5% w/v. Preferred formulations are shown in Table 2.

TABLE 2

EXEMPLARY FORMULAS FOR BUILT POWDERED PRODUCT

| MATERIAL: | FORMULA 1 | FORMULA 2 | FORMULA 3 |
|---|---|---|---|
| SODIUM HYDROXIDE, BEADS | 88.00 | 88.00 | 88.00 |
| SODIUM GLUCONATE | 6.00 | 8.00 | 6.00 |
| ACUSOL 505ND, 92% ACTIVE | 1.00 | 1.00 | 1.00 |
| SODA ASH, GRADE 100 | 3.80 | 1.80 | 3.80 |
| TRITION 98/375 NONIONIC SURFACTANT | 1.20 | 1.20 | 0 |
| PLURAFAC LF 431 | 0 | 0 | 1.2 |
| RECOMMENDED USE % W/V | 3.4 | 3.4 | 3.4 |

An all-in-one liquid composition will include at least about 30% of a 50% solution of sodium hydroxide (and preferably 80% of a 50% solution), along with 0.1% to about 5% crystal growth inhibitor, 0 to about 10% chelant, preferably at least 1%, and 0 to about 10%, preferably at least 0.1%, nonionic surfactant. These are simply blended together to form a stable liquid solution, emulsion or dispersion. Again, no NTA, EDTA or phosphates are included. This composition should be used at a concentration of 2–10% V/V. Typical formulations are shown in Table 3.

TABLE 3

EXEMPLARY FORMULAS FOR BUILT LIQUID PRODUCT

| MATERIAL | FORMULA 4 | FORMULA 5 |
|---|---|---|
| SODIUM HYDROXIDE, 50% LIQUOR | 91.79 | 87.00 |
| SODIUM GLUCONATE, 45% LIQUOR | 7.50 | 7.50 |
| ACUSOL 505N; 35% ACTIVE | 0.50 | 0.50 |
| TRITON BG 10, 70% ACTIVE | 0.14 | 0 |
| DEHYPON LT 104 MODIFIED FATTY ALCOHOL GLYCOL ETHER | 0 | 5.00 |
| RECOMMENDED USE % V/V | 6.70 | 6.90 |

In use, these would simply be added to fresh water in the soaking portion of the bottle washing apparatus, or will be added to the soaking portion of the bottle washing apparatus as make-up water is added, or when concentration probes indicate the need for additional caustic to maintain the desired concentration. The bottle washer would then be operated in its usual manner, generally soaking the bottles with the caustic solution for 7–15 minutes at 60°–80° C.

In addition to using an all-in-one composition, operators of bottle washers frequently add caustic separately and add the water treatment and detergent system as a package. Accordingly, a liquid solution of additives without caustic will preferably include about 0 to 20% chelant, preferably gluconic acid or salts thereof, 0 to 10% nonionic surfactant, and at least about 1–10% crystal growth inhibitor. Preferably, this will include at least about 20% sodium gluconate, at least about 4% nonionic surfactant, and at least about 5% acrylate, all on a by-weight basis. Typical formulations for liquid additives are shown in Table 4. Formulas 12–14 do not include caustic and are designed only to inhibit etching, whereas formulas 6–11 are complete soaking formulations.

TABLE 4

EXEMPLARY FORMULAS FOR LIQUID ADDITIVES

| MATERIAL | FORMULA 6 | FORMULA 7 | FORMULA 8 | FORMULA 9 | FORMULA 10 | FORMULA 11 | FORMULA 12 | FORMULA 13 | FORMULA 14 |
|---|---|---|---|---|---|---|---|---|---|
| WATER | 71.00 | 59.00 | 72.00 | | 66.00 | | 75.00 | 95.00 | 50.00 |
| Sodium Hydroxide, 50% liquor | | 5.00 | | | | | | | |
| Sodium Gluconate, 45% liquor | | | | | | 44.0 | 20.00 | | |
| Sodium gluconate, 100% powder | 20.00 | 20.00 | 20.00 | | 20.00 | | | | |
| Acusol 479N | | | | 26.00 | | | | | |
| Acusol 505N | 5.00 | 5.00 | 5.00 | | 5.00 | 20.0 | 5.00 | 5.00 | 50.00 |
| Gluconic Acid, 50% | | | | 28.00 | | | | | |
| Glycolic Acid, 70% | | | | 30.00 | | | | | |
| Triton BG 10 | | | 1.00 | | 3.00 | 12.0 | | | |
| Triton CG 110 | 2.00 | 4.00 | | | | | | | |
| Triton DF 16 | | | | | | | | | |
| Triton DF 12 | | 2.00 | | | | | | | |
| Mona NF 10 | 2.00 | | 2.00 | | 6.00 | 24.0 | | | |
| Plurafac LF 431 | | | | 16.00 | | | | | |
| Emery 6358 | | 5.00 | | | | | | | |
| Recommended use % v/v | 0.1–0.25% | 0.1–0.25% | 0.1–0.25% | 0.2% | 0.1% | 0.1% | 0.1% | 0.1% | 0.1% |

NOTE:
Built Liquid & Powdered Products: Provide causticity, detergents, hardness control and anti-etch
Complete Additives: Provide detergents, hardness control and anti-etch.
Anti-Etch Additive: Meant to provide only anti-etch ingredients. May be used with normal detergent additives.

A powder additive composition, i.e., without caustic, should include basically the same components, i.e., 0–20% chelant, 0–20% nonionic surfactant, 0–10% crystal growth inhibitor. These compositions were formulated and tested to determine their effect on glass. Again, typical formulations are shown in Table 5.

TABLE 5

EXEMPLARY FORMULAS FOR COMPLETE POWDERED ADDITIVES

| MATERIAL | TYPICAL RANGE | Formula 15 | Formula 16 | Formula 17 |
|---|---|---|---|---|
| Soda Ash, grade 100 | 0–50 | 5.00 | 35.00 | 29.70 |
| Sodium Sulfate | 0–50 | 30.00 | | |
| Triton BG 10 | 0–10 | | | 2.12 |
| Plurafac LF 431 | 0–10 | 5.00 | 5.00 | 7.58 |
| Sodium gluconate 100% powder | 0–60 | 50.00 | 50.00 | 50.50 |
| Acusol 479 ND | 0–10 | | | |
| Acusol 505 ND | 0–10 | 10.00 | 10.00 | 10.10 |
| Recommended use % w/v | 0.1–0.25% | 0.1–0.25% | 0.1–0.25% | 0.1–0.25% |

In order to test the formulations listed in Formulas 1 through 5, these were combined with water at the concentration listed in the Table 6 below. The concentration was determined by the need for 3% sodium hydroxide in the wash bath. For additives (6–17), a typical dosing concentration of 0.1% was used since this is the typical level used and preferred for bottle-wash additives. The additives were tested in a 3% solution of sodium hydroxide.

TABLE 6

| | Concentration |
|---|---|
| Formula 1 | 3.4% w/w |
| Formula 2 | 3.4% w/w |
| Formula 3 | 3.4% w/w |
| Formula 4 | 6.7% v/v |
| Formula 5 | 6.0–6.9% v/v |
| Formula 6 | 0.5% v/w |
| Formula 7 | 0.1–0.5% v/w |
| Formula 8 | 0.1–0.25% v/w |
| Formula 9 | 0.1% v/w |
| Formula 11 | 0.05–0.10% v/w |
| Formula 12 | 0.1% v/w |
| Formula 13 | 0.1% v/w |
| Formula 14 | 0.1% v/w |
| Formula 15 | 0.4% w/w |
| Formula 16 | 0.1% w/w |
| Formula 17 | 0.1% w/w |

In order to test these solutions, laboratory microscope slides were placed in the solution and held at 71° C. for 72 hours. For each of these formulations, the slides remained crystal clear with no haze which is typical of caustic attack. Slides treated with 3% NaOH without additives exhibited a severe white haze and increased weight loss.

These formulations do not promote etching of the glass, and further actually act to inhibit etching of the glass by the sodium hydroxide. This reduces silicate scale, maintains the appearance of the bottle, and reduced dissolution of the glass. This, in turn, maintains the strength and integrity of the bottle.

Although less preferred, a bottle-washing composition which does not promote etching can be formulated from simply caustic, in an amount effective to provide 1% to 7.5% caustic in use, in combination with one or more of the surfactants listed in Table 7, as long as the washing solution is substantially free of the components listed in Table 1, i.e., the components are not present in excess of the concentration limit stated in Table 1.

TABLE 7

| Type or Class | Chemical Description | Range of Effective Concentration |
|---|---|---|
| Nonionic Surfactant | common name: Polysorbate 80 chemical name: Polyoxyethylene (20) sorbitanmono-oleate | 1000–1500 ppm |
| Amphoteric surfactant | Didosium tallow iminodipropionate | 150–300 ppm |
| Amphoteric surfactant | Disodium cocoamphodiacetate OR cocoamphocarboxyglycinate | 25 to 500 ppm |
| Anionic surfactant | Carboxylated linear alcohol alkoxylate, sodium salt | 500–2500 ppm |
| Phosphonate | Phosphono, 1,2,4 butane tricarboxylic acid (50%) | 10–100 ppm |
| Anionic glucoester | Disodium cocoglucoside Citrate | 300 ppm |
| Anionic glucoester | Disodium Cocoglucoside sulfo-succinate | 450 ppm |
| Anionic glucoester | Sodium cocopolyglucose Tartrate | 300 ppm |
| Chelant | Gluconate | 250–2000 ppm |
| Chelant | Glucoheptanate | 250–2000 ppm |
| Chelant | Polyalkylglucoside | 10–2500 ppm |

This has been a description of the present invention, along with the preferred method of practicing the invention presently known to the inventor. However, the invention itself should be defined only by the appended claims wherein

I claim:

1. A method of cleaning bottles comprising soaking said bottles in a solution containing from about 1% to about 7.5% sodium hydroxide and at least about 25 ppm of a polycarboxylic acid crystal growth inhibitor wherein said solution contains less than 100 ppm phosphate compound, less than 100 ppm of either EDTA or NTA, and less than 2000 ppm phosphonate composition.

2. The method claimed in claim 1 wherein said solution further includes at least about 250 ppm of a chelant selected from the group consisting of gluconates, glucoheptonates, and boroheptonates.

3. The method claimed in claim 2 wherein said solution further includes from about 100 to about 2500 ppm of an alkylpolyglucoside.

4. The method claimed in claim 1, further comprising at least one surfactant selected from the group consisting of polysorbates, iminodiproprionates, carboxylated linear alcohol carboxylates, anionic glucoesters, disodium cocoamphodiacetate, and disodium cocoamphocarboxylglycinates.

5. A powdered bottle washing composition comprising: at least about 60% sodium hydroxide and at least about 0.1% carboxylic acid crystal growth inhibitor, the composition having less than 100 ppm of a phosphate compound, less than 100 ppm of either ethylene diamine tetraacetic acid or nitrilotriacetic acid, and less than 2000 ppm of a phosphonate composition.

6. The composition claimed in claim 5 and further comprising from about 2 to about 10% of a chelant selected from the group consisting of gluconates, glucoheptonates and boroheptonates.

7. The composition claimed in claim 6 wherein said composition further includes from about 0.1% to about 10% of a nonionic surfactant.

8. The composition claimed in claim 7 wherein said nonionic surfactant is an alkyl polyglucoside.

9. The composition claimed in claim 6, further comprising a surfactant selected from the group consisting of polysorbates, iminodipropionates, carboxylated linear alcohol, alkoxylates, anionic glucoesters, disodium cocoamphodiacetates, and disodium cocoamphocarboxylglycinate.

10. A liquid bottle washing composition comprising from about 30% to about 50% of sodium hydroxide, and from about 0.1% to about 5% of a polycarboxylic acid crystal growth inhibitor wherein said composition contains less than 100 ppm of a phosphate compound and less than 100 ppm of either ethylene diamine tetraacetic acid or nitrilotriacetic acid.

11. The liquid bottle washing composition claimed in claim 10 further comprising from about 1% to about 10% of a chelant selected from the group consisting of gluconates, glucoheptonates and boroheptonates.

12. The composition claimed in claim 10 wherein said composition further includes from about 0.1% to about 10% of a nonionic surfactant.

13. The composition claimed in claim 12 wherein said nonionic surfactant is an alkylpolyglucoside.

14. The composition claimed in claim 11, further comprising a surfactant selected from the group consisting of polysorbates, iminodipropionates, carboxylated linear alcohol, alkoxylates, anionic glucoesters, disodium cocoamphodiacetates, and disodium cocoamphocarboxylglycinate.

15. An additive for a bottle cleaning composition comprising an effective amount of a polycarboxylic acid crystal growth inhibitor, in combination with a chelant selected from the group consisting of gluconates, glucoheptonates and boroheptonates, wherein said composition contains less than 100 ppm of a phosphate compound and less than 100 ppm of either ethylene diamine tetraacetic acid or nitrilotriacetic acid.

16. An additive for a bottle cleaning solution comprising an effective concentration of a polycarboxylic acid crystal growth inhibitor, in combination with an effective concentration of a nonionic surfactant, wherein said additive contains less than 100 ppm of a phosphate compound and less than 100 ppm of either ethylene diamine tetraacetic acid or nitrilotriacetic acid.

17. The additive claimed in claim 16 wherein said nonionic surfactant is an alkyl polyglucoside.

18. The additive claimed in claim 16 further comprising a chelant selected from the group consisting of gluconates, glucoheptonates and boroheptonates.

19. A bottle-washing composition which does not promote etching of glass, comprising an effective amount of sodium hydroxide with an effective concentration of at least one of the compositions selected from the group consisting of polysorbates, disodium tallow, amino diproprionate, disodium cocoamphodiacetate, carboxylated linear alcohol alkoxylates, phosphono, 1,2,4 butane tricarboxylic acid, anionic glucoester, gluconate, glucoheptonate, and polyalkygluconate, wherein said bottle-washing solution contains less than 100 ppm of a phosphate compound, less than 100 ppm of either ethylene diamine tetraacetic acid or nitrilotriacetic acid and less than 2000 ppm of a phosphonate composition.

20. A method of cleaning bottles comprising soaking said bottles in a solution containing from about 1% to about 7.5% sodium hydroxide and an effective concentration of at least one of the compositions selected from the group consisting of polysorbates, disodium tallow, amino diproprionate, disodium cocoamphodiacetate, carboxylated linear alcohol alkoxylates, phosphono, 1,2,4 butane tricarboxylic acid, anionic glucoester, gluconate, glucoheptonate, and polyalkylgluconate, wherein said bottle-washing solution contains less than 100 ppm of a phosphate compound, less than 100 ppm of either ethylene diamine tetraacetic acid or nitrilotriacetic acid and less than 2000 ppm of a phosphonate composition.

* * * * *